US008626441B2

(12) United States Patent
Matthews (10) Patent No.: US 8,626,441 B2
(45) Date of Patent: Jan. 7, 2014

(54) METHODS AND APPARATUS FOR USING POSITION/ATTITUDE INFORMATION TO ENHANCE A VEHICLE GUIDANCE SYSTEM

(75) Inventor: Paul Matthews, Bel Aire, KS (US)

(73) Assignee: AGCO Corporation, Duluth, GA (US)

( * ) Notice: Subject to any disclaimer, the term of this patent is extended or adjusted under 35 U.S.C. 154(b) by 1292 days.

(21) Appl. No.: 12/140,435

(22) Filed: Jun. 17, 2008

(65) Prior Publication Data

US 2009/0312948 A1    Dec. 17, 2009

(51) Int. Cl.
*G01C 21/00* (2006.01)
(52) U.S. Cl.
USPC ........... 701/480; 701/408; 701/468; 701/469; 701/472; 701/473
(58) Field of Classification Search
USPC .......................... 701/214, 408, 473, 479, 480
See application file for complete search history.

(56) References Cited

U.S. PATENT DOCUMENTS

| | | | | |
|---|---|---|---|---|
| 4,507,962 A | * | 4/1985 | Hitt et al. ...................... 73/384 |
| 5,928,309 A | * | 7/1999 | Korver et al. ................ 701/214 |
| 5,957,304 A | | 9/1999 | Dawson |
| 5,995,894 A | | 11/1999 | Wendte |
| 6,127,970 A | | 10/2000 | Lin |
| 6,234,799 B1 | | 5/2001 | Lin |
| 6,282,496 B1 | * | 8/2001 | Chowdhary ................. 701/220 |
| 6,330,503 B1 | | 12/2001 | Sharp et al. |
| 6,456,906 B1 | | 9/2002 | Hua |
| 6,505,146 B1 | | 1/2003 | Blackmer |
| 6,549,852 B2 | | 4/2003 | Hanson |
| 6,593,879 B1 | | 7/2003 | Campbell |
| 6,606,542 B2 | | 8/2003 | Hauwiller et al. |
| 6,735,523 B1 | | 5/2004 | Lin et al. |
| 6,745,128 B2 | | 6/2004 | Hanson |
| 6,785,594 B1 | * | 8/2004 | Bateman et al. .................. 701/9 |
| 6,834,234 B2 | | 12/2004 | Scherzinger et al. |
| 7,149,629 B1 | | 12/2006 | Scherzinger et al. |
| 2002/0057217 A1 | | 5/2002 | Milnes |

(Continued)

FOREIGN PATENT DOCUMENTS

| | | |
|---|---|---|
| AU | 755 096 B2 | 12/2002 |
| GB | 2 329 731 A | 3/1999 |
| JP | 08 304069 A | 11/1996 |

OTHER PUBLICATIONS

Annex to Form PCT/ISA/206 Communication Relating to the Results of the Partial International Search for PCT/IB2009/005938 (2 pgs).

*Primary Examiner* — Sheetal R Rangrej
*Assistant Examiner* — Trang Nguyen
(74) *Attorney, Agent, or Firm* — Hovey Williams LLP (57) ABSTRACT

An enhanced vehicle guidance system comprising a global navigation satellite system (GNSS) receiver and a data processor with a memory component and a computing device. The method of enhancing a vehicle's guidance system may comprise calculating the altitude, latitude, and longitude of a GNSS receiver for each of a plurality of positions; calculating the incline angle between adjacent points; and using the calculated incline angles to infer the attitude of the vehicle at any of the plurality of positions. The attitude may be used to calculated an inertial correction factor to compensate for GNSS position inaccuracies induced as a result of the vehicle rolling and pitching on uneven terrain. The altitude, latitude, longitude, and attitude of the plurality of positions may be stored in the memory such that the system may look-up the attitude for a given position without recalculating the attitude and without using an inertial sensor.

16 Claims, 6 Drawing Sheets

(56) References Cited

U.S. PATENT DOCUMENTS

| | | |
|---|---|---|
| 2003/0114984 A1* | 6/2003 | Scherzinger .................. 701/216 |
| 2003/0187560 A1* | 10/2003 | Keller et al. .................... 701/50 |
| 2003/0201912 A1* | 10/2003 | Hashida et al. .......... 340/995.12 |
| 2004/0073360 A1 | 4/2004 | Foxlin |
| 2004/0153238 A1* | 8/2004 | Miyahara ...................... 701/207 |
| 2006/0027404 A1 | 2/2006 | Foxlin |
| 2006/0178820 A1 | 8/2006 | Eglington et al. |
| 2007/0088477 A1 | 4/2007 | Brewer et al. |
| 2007/0271037 A1* | 11/2007 | Overstreet et al. ............ 701/220 |

* cited by examiner

METHODS AND APPARATUS FOR USING POSITION/ATTITUDE INFORMATION TO ENHANCE A VEHICLE GUIDANCE SYSTEM

BACKGROUND

1. Field

Embodiments of the present invention relate to the enhancement of vehicle guidance systems. More particularly, the invention relates to correcting global navigation satellite system (GNSS) data using the measured or simulated attitude of a vehicle.

2. Related Art

A global navigation satellite system (GNSS), such as the global positioning system (GPS), is an electronic satellite navigation system which permits users to determine their position with respect to the Earth. Global positioning may be determined with a GNSS receiver which detects and decodes signals from a number of satellites orbiting the Earth. The signals from each of these satellites indicate the position of the satellite and the time at which the signals were sent. GNSS receivers may calculate latitude, longitude, and altitude based on satellite signals. This information is often used in vehicle guidance systems to guide a vehicle and direct it to perform certain tasks at a particular position. For example, an agricultural vehicle may be guided to a precise position by a GNSS receiver and commanded to drop a seed at that particular position.

Discrepancies may arise between the position information provided to the guidance system by the GNSS receiver and the actual ground position of the vehicle. Particularly, when the vehicle is on an incline, the calculated latitude and longitude position of the GNSS receiver may not be the same as the actual latitude and longitude ground position of the vehicle. These discrepancies can cause a vehicle guidance system utilizing GNSS information to inaccurately guide and instruct the vehicle, because the guidance system assumes that the GNSS receiver latitude and longitude position is the same as the vehicle ground position.

Accordingly there is a need for a method of correcting position information provided to the vehicle guidance system by GNSS that does not suffer from the problems and limitations of the prior art.

SUMMARY

Embodiments of the present invention provide an enhanced vehicle guidance system that uses information from a global navigation satellite system (GNSS) receiver, such as latitude, longitude, and altitude, to infer or simulate attitude information without the use of an inertial sensor. Additionally, the enhanced guidance system may provide inertial correction factors to correct discrepancies in GNSS receiver position values caused by uneven terrain. The invention may also take advantage of the fact that topology (i.e. the rolling and pitching profile) of a field typically does not appreciably change from year to year. The guidance system therefore may use pre-recorded associated position and attitude information to increase the robustness of high-end position systems and remove the extra inertial sensor in lower cost positioning systems while still compensating for terrain undulation.

An exemplary embodiment of the enhanced vehicle guidance system may comprise a position-determining component such as a GNSS receiver and a data processor with data storage and data processing capabilities. A method of enhancing a vehicle's guidance system without using an inertial sensor may comprise measuring the altitude, latitude, and longitude of the position-determining component for each of a plurality of positions; calculating the incline angle between adjacent points; and using the calculated incline angles to infer the attitude of the vehicle at any of the plurality of positions to compensate for GNSS position inaccuracies induced as a result of the vehicle rolling and pitching on uneven terrain.

Additionally, the altitude, latitude, and longitude of the plurality of positions may be plotted to create a topology map or terrain profile. By recording the altitude, latitude, longitude, and attitude information for each of the plurality of positions, the data processor may access this data upon subsequent visits to these positions such that the system may look-up the stored attitude for a given position without recalculating the attitude and without using an inertial sensor. The data processor may also calculate attitude information of an intermediate position point between the plurality of positions by curve fitting the recorded data or using algorithms to interpolate the intermediate point. The curve-fitted or interpolated intermediate point is then used with the neighboring points' data to determine or approximate the attitude information.

At any given position at time (T) the attitude information may be read from an inertial sensor or simulated from the GNSS data and applied substantially in real-time to calculate the actual ground position at time (T). To solve for the corrected position, an inertial correction factor at time (T) is calculated from the attitude information and is added to the GNSS-calculated position at time (T). Additionally, the inertial correction factors for a plurality of positions may be recorded and later accessed by the data processor upon subsequent visits to these positions such that the system may look-up the stored inertial correction factor for a given GNSS-calculated position without recalculating this correction factor. Alternatively, the calculated ground position for a given GNSS-calculated position may be recorded and later accessed by the data processor upon subsequent visits to that position.

In various embodiments of the invention, the vehicle guidance system may use prerecorded position and attitude data to "look ahead" and preempt any variations in undulation so that performance can be maximized, rather than reacting when the undulations are just becoming apparent to the vehicle. For example, the vehicle guidance system implemented in a harvesting vehicle may adjust its blade altitude just before an upcoming undulation in a field, instead of making this adjustment after the undulation is sensed.

These and other important aspects of the present invention are described more fully in the detailed description below.

BRIEF DESCRIPTION OF THE DRAWINGS

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

The following detailed description of the invention references the accompanying drawing figures that illustrate specific embodiments in which the present invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense.

Figure 1:
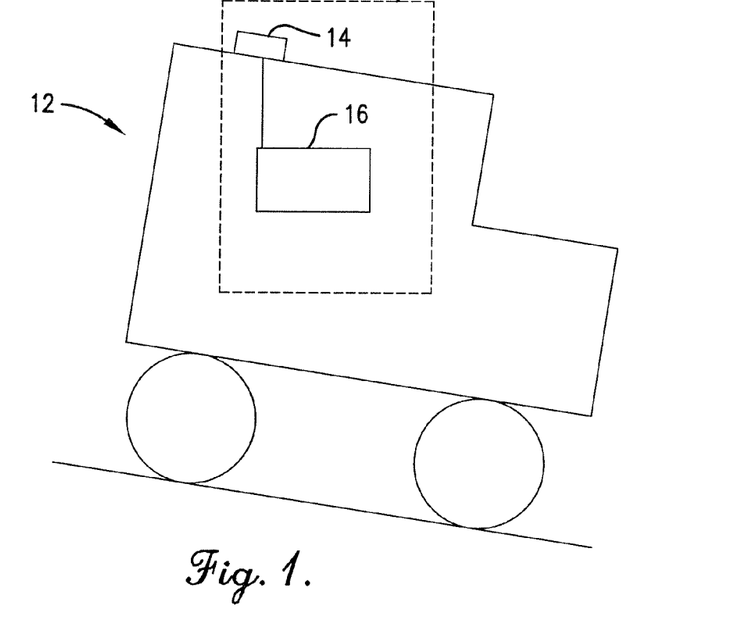
FIG. 1 is a schematic elevational view showing a vehicle guidance system of a vehicle according to an embodiment of the invention.
Figure 2:
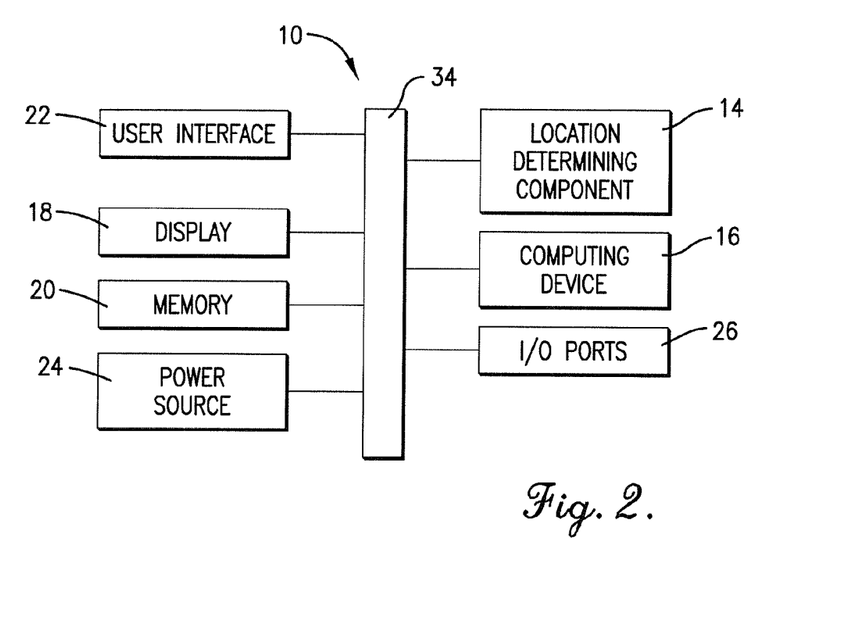
FIG. 2 is a block diagram illustrating certain components of the guidance system of FIG. 1.

Embodiments of the present invention, as illustrated in FIG. 1, provide an enhanced vehicle guidance system 10 preferably incorporated as part of a land-based vehicle 12 such as an agricultural vehicle, automobile, all-terrain vehicle, or any other type of land-based vehicle known in the art. The vehicle guidance system 10 can be implemented in hardware, software, firmware, or a combination thereof. An exemplary embodiment of the vehicle guidance system 10 may include a position-determining component 14 and a computing device 16. The enhanced guidance system 10 is operable to compensate for discrepancies, caused by uneven terrain, between the latitude and longitude of the position-determining component 14 and the actual ground position latitude and longitude of the vehicle 12. The vehicle guidance system 10 may also include a display 18, memory 20, a user interface 22, a power source 24, and one or more I/O ports 26, as illustrated in FIG. 2.

The position-determining component 14, which may be mounted to an elevated portion of the vehicle 12, determines positions of the vehicle guidance system 10 as it is moved from place to place and generates and sends corresponding position data to the computing device 16. In one embodiment, the position-determining component 14 may be a satellite navigation receiver that works with a global navigation satellite system (GNSS) such as the global positioning system (GPS) primarily used in the United States, the GLONASS system primarily used in the Soviet Union, or the Galileo system primarily used in Europe.

Figure 3:
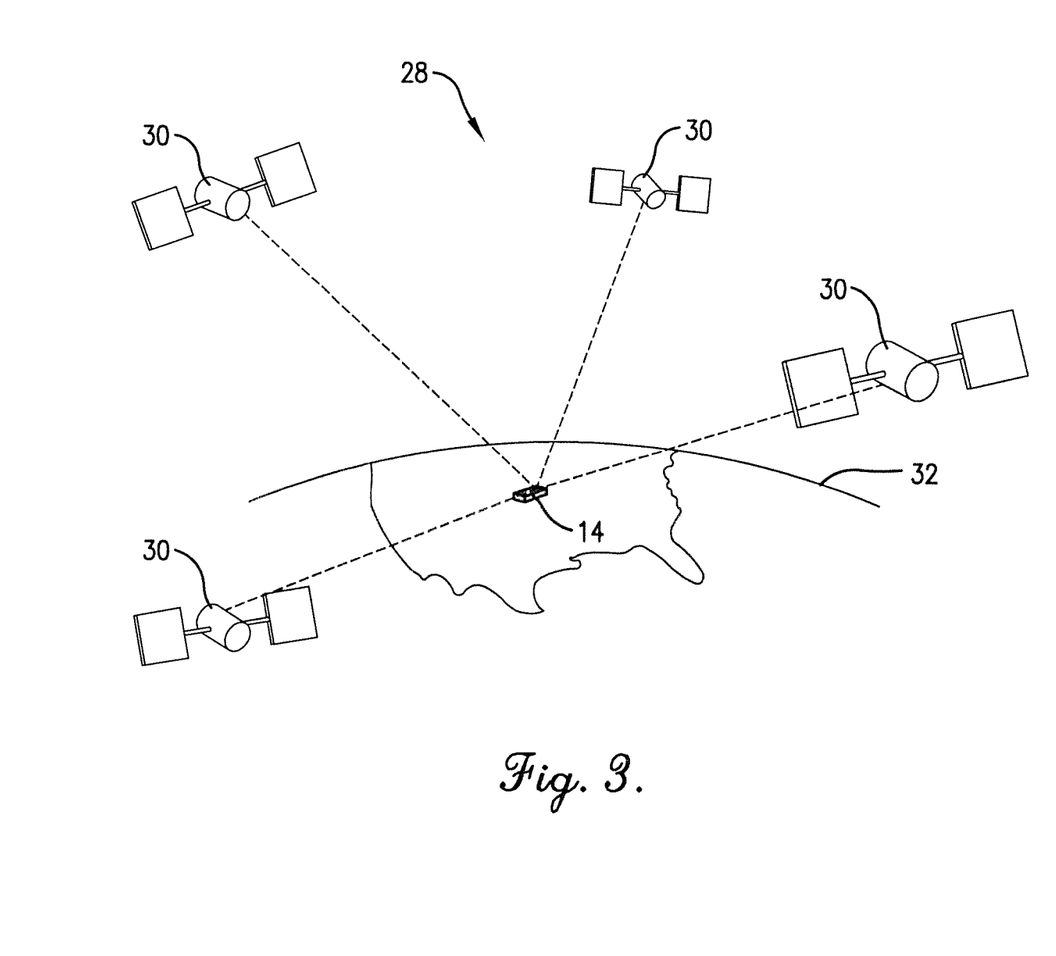
FIG. 3 is a schematic diagram of a global navigation satellite system (GNSS) that may be used to send GNSS signals to the vehicle guidance system.

FIG. 3 shows a representative view of a GNSS denoted generally by reference numeral 28. A plurality of satellites 30 are in orbit about the Earth 32. The orbit of each satellite is not necessarily synchronous with the orbits of other satellites and, in fact is likely asynchronous. The position-determining component 14 is shown as a GNSS receiver, receiving spread spectrum GNSS satellite signals from the various satellites 30.

The spread spectrum signals continuously transmitted from each satellite 30 utilize a highly accurate frequency standard accomplished with an extremely accurate atomic clock. Each satellite 30, as part of its data signal transmission, transmits a data stream indicative of that particular satellite. In various embodiments, as a GNSS receiver, the position-determining component 14 must acquire spread spectrum GNSS satellite signals from at least three satellites for the position-determining component 14 to calculate its two-dimensional position by triangulation. Acquisition of an additional signal, resulting in signals from a total of four satellites, permits the position-determining component 14 to calculate its three-dimensional position. The position-determining component 14 may include an antenna to assist in receiving the satellite signals. The antenna may be any type of antenna that can be used with navigational devices.

The position-determining component 14 is operable to receive navigational signals from the GNSS satellites 30 and to calculate positions of the position-determining component 14 as a function of the signals. The position determining component 14 may send these calculated positions to the computing device 16 to determine track logs or any other series of geographic coordinates corresponding to points along a path traveled by the vehicle 12. The computing device 16 is also operable to calculate routes to desired positions, provide instructions to navigate to the desired positions, display maps and other information on the display screen 18, and execute other functions described herein.

Although one embodiment of the vehicle guidance system 10 describes the position-determining component 14 as a GNSS receiver, it is noted that equivalents may be employed and substitutions made without departing from the scope of the invention as recited in the claims. For example, in other embodiments of the invention, the position determining component 14 need not directly determine its current geographic position. For instance, the position determining component 14 may determine the current geographic position by receiving position information directly from the user, through a communications network, or from another electronic device.

The position determining component 14 may include one or more processors, controllers, or other computing devices and memory so that it may calculate position and other geographic information without the computing device 16 or it may utilize the components of the computing device 16. Further, the position determining component 14 may be integral with the computing device 16 such that the position determining component may be operable to specifically perform the various functions described herein. Thus, the computing device 16 and position determining component 14 can be combined or be separate or otherwise discrete elements.

The display 18 is coupled with the computing device 16 and is operable to display various information corresponding to the vehicle 12 and its guidance system 10, such as maps, positions, and directions as described below. The display 18 may comprise conventional black and white, monochrome, or color display elements including CRT, TFT, LCD, and/or plasma display devices. Preferably, the display 18 is of sufficient size to enable the user to easily view it while driving the vehicle 12.

The display 18 may be integrated with the user interface 22, such as in embodiments where the display 18 is a touch-screen display to enable the user to interact with it by touching or pointing at display areas to provide information to the guidance system 10.

The computing device 16 may include any number of processors, controllers, integrated circuits, programmable logic devices, or other computing devices and resident or external memory for storing data and other information accessed and/or generated by the vehicle guidance system 10. The computing device 16 is preferably coupled with the position-determining component 14, the display 18, the memory 20, the user interface 22, and other components through wired or wireless connections, such as a data bus 34, to enable information to be exchanged between the various components.

The computing device 16 may implement a computer program and/or code segments to perform the functions described herein. The computer program preferably comprises an ordered listing of executable instructions for implementing logical functions in the computing device. The computer program can be embodied in any computer-readable medium for use by or in connection with an instruction execution system, apparatus, or device, and execute the instructions. In the context of this application, a "computer-readable medium" can be any means that can contain, store, communicate, propagate or transport the program for use by or in connection with the instruction execution system, apparatus, or device. The computer-readable medium can be, for example, but not limited to, an electronic, magnetic, optical, electro-magnetic, infrared, or semi-conductor system, apparatus, device, or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

The memory 20 may be integral with the position determining component 14, integral with the computing device 16, stand-alone memory, or a combination of both. The memory may include, for example, removable and non-removable memory elements such as RAM, ROM, flash, magnetic, optical, USB memory devices, and/or other conventional memory elements.

The memory 20 may store various data associated with operation of the guidance system 10, such as the computer program and code segments mentioned above, or other data for instructing the computing device 16 and system elements to perform the steps described herein. Further, the memory 20 may store various cartographic data corresponding to geographic positions including map data, and map elements, such as thoroughfares, terrain, alert positions, points of interest, geographic entities, radio stations, and other navigation data to facilitate the various navigation functions provided by the vehicle guidance system 10. Additionally, the memory 20 may store destination addresses and previously calculated or otherwise acquired routes to various destination addresses for later retrieval by the computing device 16.

The various data stored within the memory 20 may be associated within one or more databases to facilitate retrieval of the information. For example, the databases may be configured to enable the computing device 16 to automatically access attitude information based upon a current geographic position of the position-determining component 14 as discussed in more detail below.

The user interface 22 permits a user to operate the vehicle guidance system 10 and enables users, third parties, or other devices to share information with the guidance system 10. The user interface 22 may comprise one or more functionable inputs such as buttons, switches, scroll wheels, a touch screen associated with the display 18, voice recognition elements such as a microphone, pointing devices such as mice, touchpads, trackballs, styluses, a camera such as a digital or film still or video camera, combinations thereof, etc. Further, the user interface 22 may comprise wired or wireless data transfer elements such as removable memory including the memory 20, data transceivers, etc, to enable the user and other devices or parties to remotely interface with the guidance system 10. The device may also include a speaker for providing audible instructions and feedback.

The user interface 22 may be operable to provide various information to the user utilizing the display 18 or other visual or audio elements such as a speaker.

Thus, the user interface 22 enables the user and guidance system 10 to exchange information relating to the guidance system 10, including geographic entities, configuration information, security information, preferences, route information, points of interests, alerts and alert notification, navigation information, waypoints, a destination address, etc.

The power source 24 provides electrical power to various guidance system 10 elements. For example, the power source 24 may be directly or indirectly coupled with the position-determining component 14, the display 18, the computing device 16, the memory 20, and the user interface 22. The power source 24 may comprise conventional power supply elements, such as batteries, battery packs, etc. The power source 24 may also comprise power conduits, connectors, and receptacles operable to receive batteries, battery connectors, or power cables.

The I/O ports 26 permit data and other information to be transferred to and from the computing device 16 and the position determining component 14. The I/O ports 26 may include a TransFlash card slot for receiving removable TransFlash cards and a USB port for coupling with a USB cable connected to another computing device such as a personal computer. Navigational software, cartographic maps, and other data and information may be loaded in the guidance system 10 via the I/O ports.

The components shown in FIG. 2 and described herein need not be physically connected to one another since wireless communication among the various depicted components is permissible and intended to fall within the scope of the present invention.

In operation, the position-determining component 14 may provide, in a conventional manner, geographic position information based on signals received from two or more members of an array of orbiting satellites. The position-determining component 14 may obtain data related to the latitude, longitude, and altitude of the elevated portion of the vehicle 12 and then send that data to the computing device 16. Then the computing device 16 may use measured or simulated vehicle attitude information to compensate for discrepancies, due to uneven terrain, between the latitude and longitude of the position-determining component 14 and the actual ground position latitude and longitude of the vehicle 12.

Figure 4:
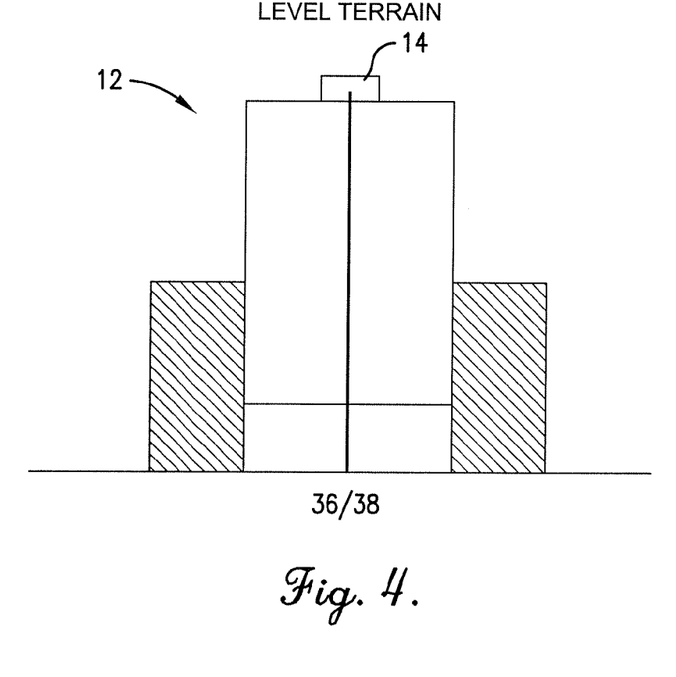
FIG. 4 is a schematic elevation view showing the vehicle on level terrain.
Figure 5:
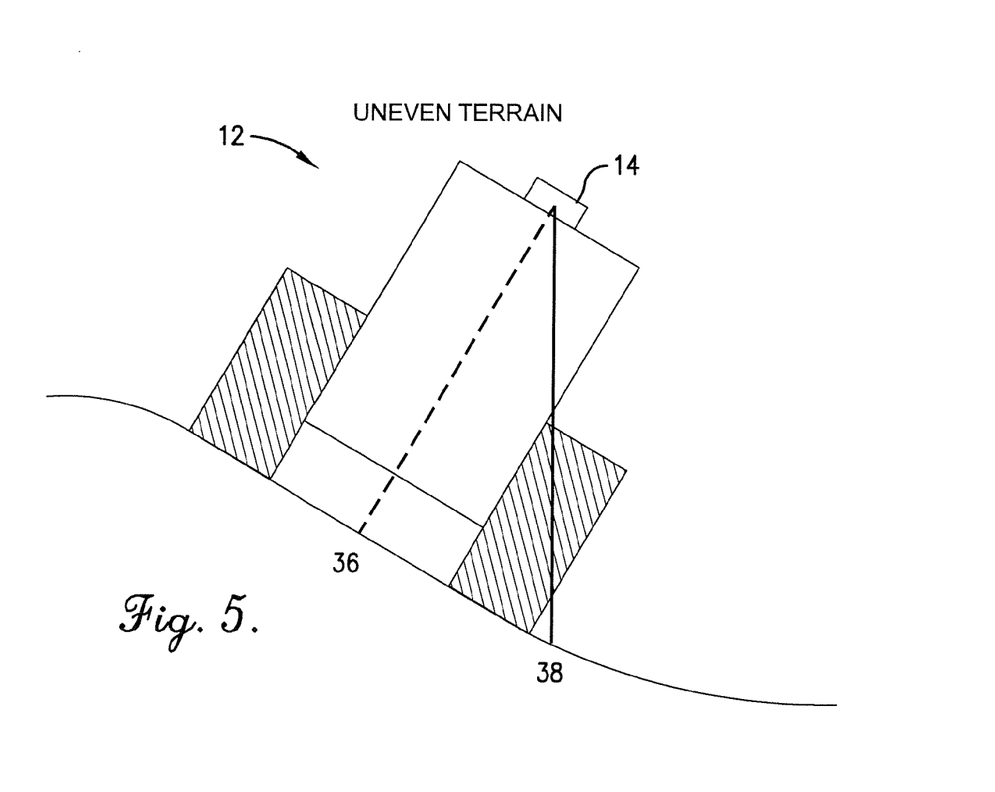
FIG. 5 is a schematic elevation view showing the vehicle on uneven terrain.

FIG. 4 illustrates the vehicle 12, with the position-determining component 14, positioned on level terrain. When the terrain is level, the latitude and longitude coordinates of a ground position 36 of the vehicle are the same as the latitude and longitude coordinates of a calculated position 38 of the position-determining component 14. However, as illustrated in FIG. 5, when the ground over which the vehicle travels is tilted, sloped, or uneven, the calculated latitude and longitude position 38 of the position-determining component 14 may differ from the actual latitude and longitude ground position 36 of the vehicle 12. For instance, in FIG. 5, notice the difference between the actual ground position 16 of the vehicle 12 and the calculated latitude and longitude position 18 of the position-determining component 14.

These discrepancies can cause the vehicle guidance system 10 to inaccurately guide and instruct the vehicle 12. For example, the guidance system of the agricultural vehicle 12 on uneven terrain as illustrated in FIG. 5 may read that the latitude and longitude are currently at latitude and longitude position 38 and therefore incorrectly drop seeds at ground position 36, because the system assumes that the position-determining component's latitude and longitude position 38 is the same as the vehicle ground position 36. Therefore, to compensate for these discrepancies, in various embodiments of the invention, the computing device 16 calculates an inertial correction factor for each calculated position-determining component position 38 in order to calculate the ground position 36.

According to one embodiment of the invention, a method for enhancing a vehicle guidance system may comprise the steps of: calculating a first position of the elevated portion of the vehicle 12; calculating a second position of the elevated portion of the vehicle 12 after the vehicle 12 has moved; calculating an incline angle based on the first position and the second position without the use of an angle-measuring device; using the incline angle to infer the attitude of the vehicle 12; and calculating a ground position 36 of the vehicle 12 based on the attitude of the vehicle 12. However, alternatively, attitude information (such as roll angle and pitch angle) may be obtained by traditional means known in the art such as an inertial sensor, gyroscope, inclinometer, or a combination thereof. Therefore the ground position 36 may be determined using either measured or inferred attitude information, as described below.

The step of calculating the first position of the elevated portion of the vehicle 12 may comprise the position-determining component 14 calculating altitude, latitude, and longitude information associated with the present position of the elevated portion of the vehicle 12 then providing this information to the computing device 16. The computing device 16 may be programmed to retrieve current altitude, latitude, and longitude of the elevated portion of the vehicle 12 from the position-determining component 14 at predetermined time or distance intervals. Alternatively, a user may use the user interface 22 to indicate to the computing device 16 when new position data should be retrieved from the position-determining component 14.

Then, to obtain the second position of the elevated portion of the vehicle 12 after the vehicle 12 has moved, the position-determining device 14 may again calculate altitude, latitude, and longitude information associated with the present position of the elevated portion of the vehicle 12, then provide this information to the computing device 16. Both the first position and the second position may be stored in the memory 20.

The computing device 16 may then calculate the incline angle based on the altitudes, latitudes, and longitudes for the first position and the second position using algebraic and geometric mathematical expressions as known in the art. This calculated angle may be used to infer the attitude of the vehicle 12 when the vehicle is located at or between the first position and the second position. This method of inferring the attitude of the vehicle 10 may be repeated for a plurality of positions, such that each angle or slope between adjacent positions is calculated.

Figure 6:
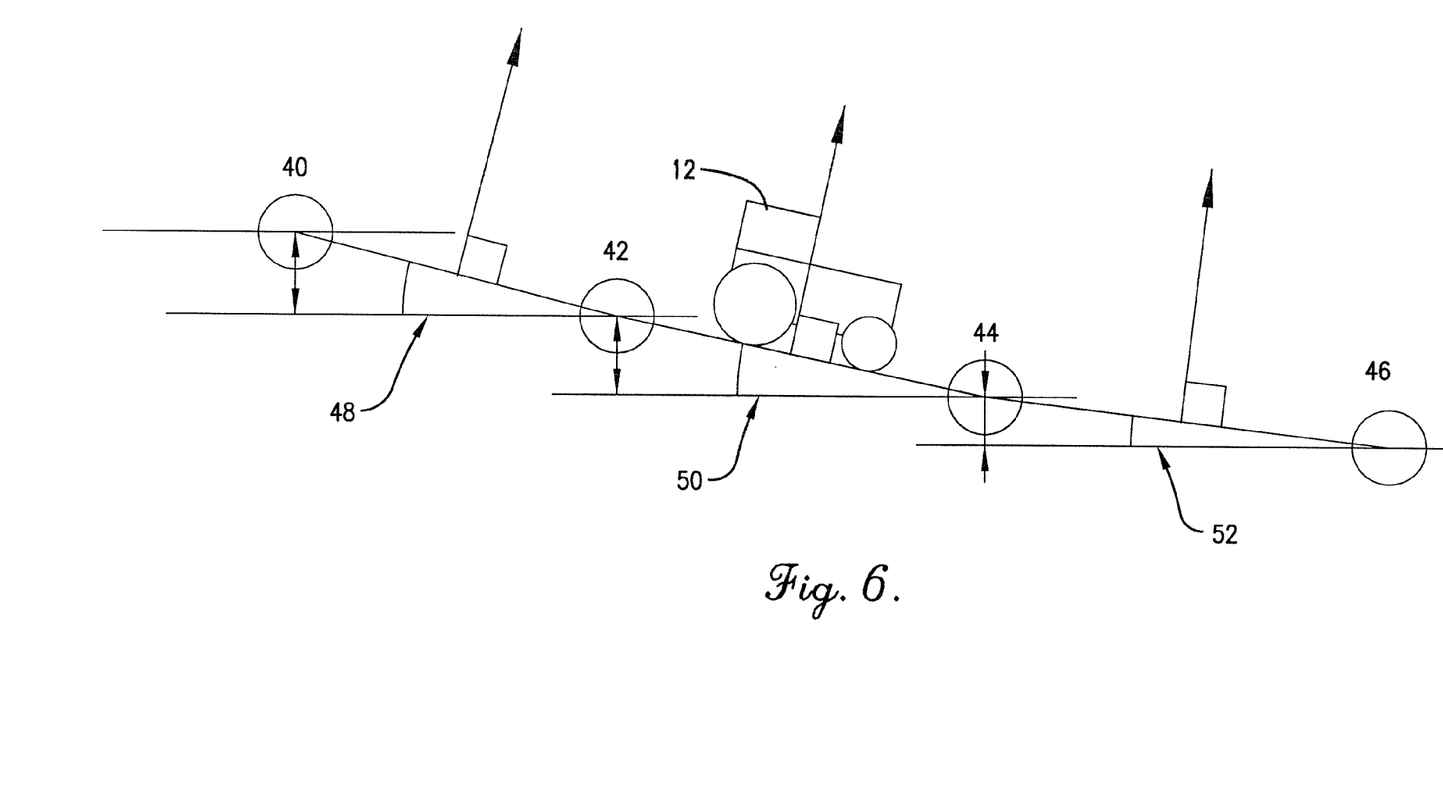
FIG. 6 is a schematic diagram illustration of a terrain profile created from position and attitude information processed by the guidance system of FIG. 1.

As an example, FIG. 6 illustrates a first recorded position 40, a second recorded position 42, a third recorded position 44, and a fourth recorded position 46. Each of these recorded positions 40-46 may be stored in the memory 20. Using the difference in altitude and distance between the first recorded position 40 and the second recorded position 42, a first pitch angle 48 may be calculated. Additionally, the difference in altitude and distance between the second recorded position 42 and the third recorded position 44 may be used to calculate a second pitch angle 50, and the difference in altitude and distance between the third recorded position 44 and the fourth recorded position 46 may be used to calculate a third pitch angle 52. A similar method may be used to determine roll angles of the vehicle.

The above-described method of inferring attitude information provides the ability to remove inertial sensors from low-cost vehicle guidance systems. Alternatively, an area of land may be "surveyed" one time for a nominal fee with equipment having inertial sensors. Then the customer may use a lower-cost system without an inertial sensor, but utilize the recorded position/attitude data from the survey to correct the lower-cost system's GNSS-calculated position information.

In various embodiments of the invention, attitude information may be used by the computing device 16 to calculate the ground position 36 of the vehicle by calculating an inertial correction factor, thereby compensating for discrepancies as a result of the vehicle rolling and pitching. So, at any given position at time (T), the attitude information at time (T) may be used to calculate the inertial correction factor at time (T), and the inertial correction factor at time (T) may be added to the calculated position 38 at time (T) to determine the actual ground position 36 at time (T). For example:

$$\text{Position}_{ground}(T) = \text{Position}_{GNSS}(T) + \text{Inertial}_{correction}(T)$$

Where:
Position$_{ground}$(T) is the actual ground position 36 at time (T),
Position$_{GNSS}$(T) is the calculated position 38 of the position-determining component at time (T), and
Inertial$_{correction}$(T) is the inertial correction factor at time (T).

The inertial correction factor is therefore the difference between the GNSS-calculated position 38 at time (T) and the actual ground position 36 at time (T). Therefore the attitude information (such as roll angle and pitch angle) may be used in algebraic or geographic equations to determine the difference between the latitude and longitude of the calculated position 38 and the latitude and longitude of the ground position 36. Furthermore, this distance may be broken into its x, y, and z components (latitude, longitude, and altitude components) using mathematical equations known in the art, and the latitude and longitude components may be added to the corresponding latitude and longitude of the calculated position 38 to determine the actual ground position 36 of the vehicle 12.

Any of the attitude information, position information, inertial correction factor, and calculated ground position 36 may be stored in the data storage component. Furthermore, upon subsequent visits to a recorded position, the computing device 16 may retrieve any of the data associated with the recorded position from the memory 20 and may output the ground position 36, the inertial correction factor, and/or the attitude information associated with the position of the position-determining component.

Figure 7:
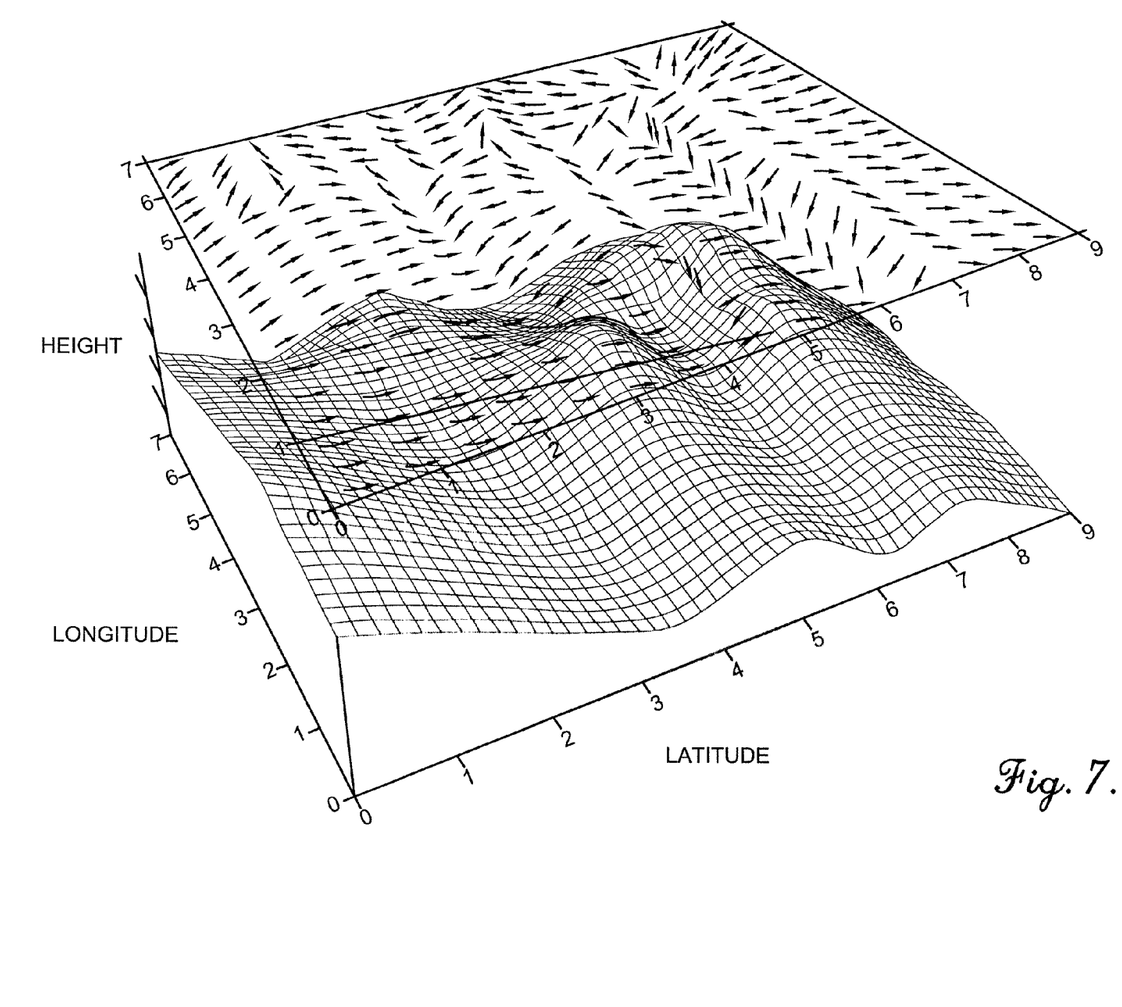
FIG. 7 is a schematic diagram illustration of pitch angle inference as determined by the guidance system of FIG. 1 from GNSS position information.

Additionally, data stored in the memory 20 may be compiled to form a terrain profile of rolling and pitching, as illustrated in FIG. 7, which may be graphically displayed on the display 18. Additionally a gradient overlay may be extracted from the position data as illustrated in FIG. 7. However, position data does not need to be collected for every square inch of an area, as algorithms can be used to interpolate the intermediate point (latitude, longitude, and altitude) data between the recorded data. This position data may then be used along with the neighboring positions' data to determine the attitude information.

Figures 8, 9:
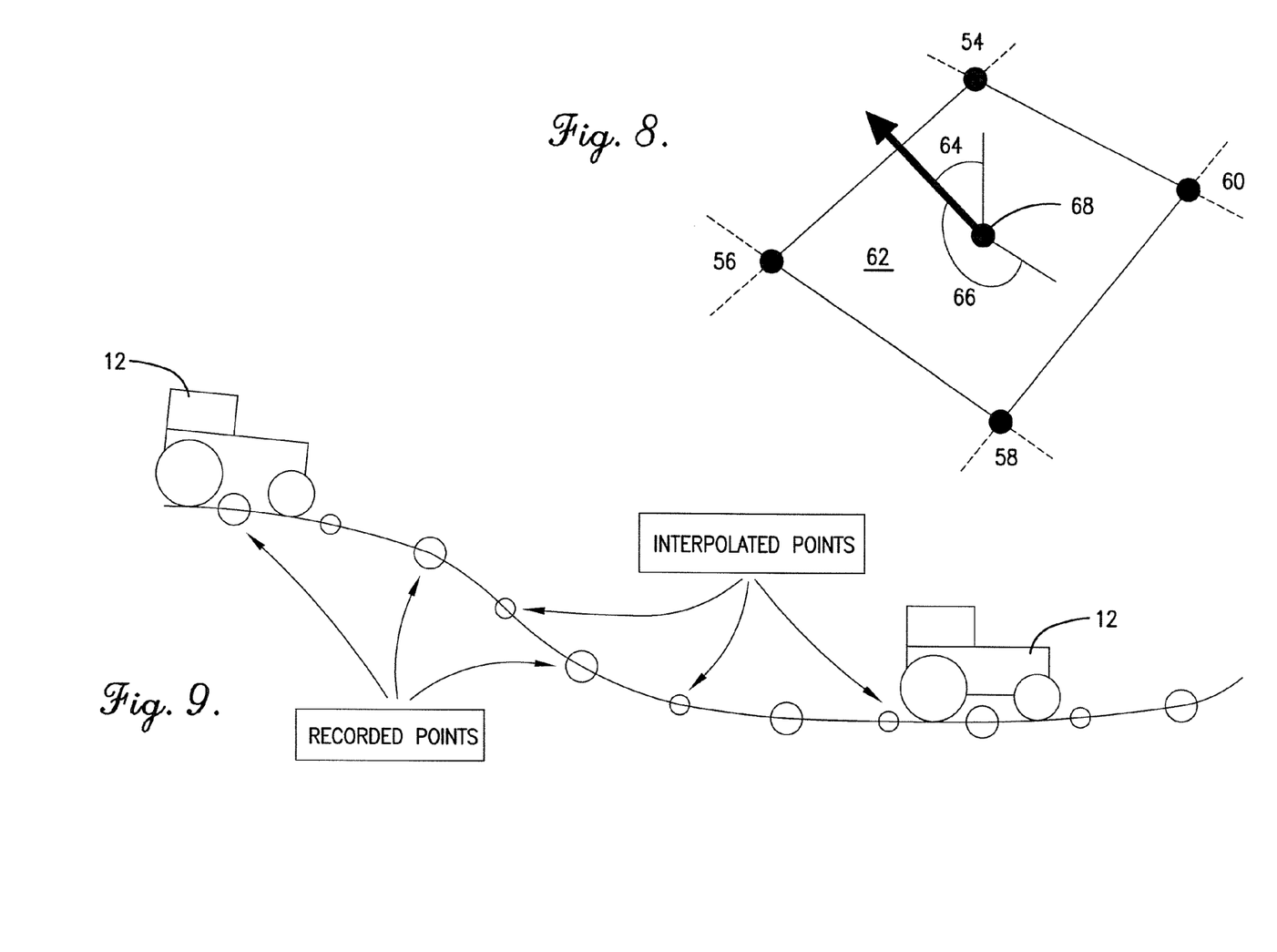
FIG. 8 is a diagram illustration of a surface normal extrapolated by the guidance system of FIG. 1 to determine position and attitude information for an intermediate position which is intermediate of a plurality of stored, pre-recorded positions.
FIG. 9 is a schematic diagram illustration of interpolating intermediate position data by curve fitting it with pre-recorded position data from the guidance system of FIG. 1.

For example, as illustrated in FIG. 8, a first data point 54, a second data point 56, a third data point 58, and a fourth data point 60 may form a surface normal 62 which may be extrapolated using the latitude, longitude, and altitude information for each of these data points 54-60. Calculating this surface normal 62 allows the computing device 16 to determine the effective roll 64 and effective pitch 66 of an intermediate point 68. Alternatively, intermediate position data may be interpolated by curve fitting the actual recorded data, as illustrated in FIG. 9.

In various embodiments of the invention, comparing output from inertial sensor with previously recorded data could improve the system robustness. Additionally, prerecorded position and/or attitude data may be used to "look ahead" and preempt any variations in undulation so that performance is maximized, rather than reacting when the undulations are just becoming apparent to the vehicle. For example, the vehicle guidance system implemented in a harvesting vehicle may adjust its blade height just before an upcoming undulation in a field, instead of making this adjustment after the undulation is sensed.

Although the invention has been described with reference to the embodiments illustrated in the attached drawings, it is noted that equivalents may be employed and substitutions made herein without departing from the scope of the invention as recited in the claims.

Having thus described an embodiment of the invention, what is claimed as new and desired to be protected by Letters Patent includes the following:

1. A method of enhancing a vehicle's guidance system having only one geographic coordinate-determining component, the method comprising:
    receiving, with a computing device of the guidance system, a plurality of geographic coordinates of an elevated portion of the vehicle as sensed by the geographic coordinate-determining component while the vehicle travels within a particular area of land;
    calculating, with the computing device, slopes between each of the geographic coordinates using only the geographic coordinates without information from any other sensors; and
    calculating, with the computing device, the attitude of the vehicle at any geographic coordinate within the particular area of land using the calculated slopes between the plurality of geographic coordinates without using an angle measuring device.

2. The method of claim 1, further comprising calculating a ground position of the vehicle based on the attitude of the vehicle at any geographic coordinate within the particular area of land.

3. The method of claim 1, further comprising:
    obtaining output, with the computing device, from an inertial sensor; and
    comparing, with the computing device, the output from the inertial sensor with the calculated attitude to correct for errors.

4. The method of claim 1, wherein the geographic coordinates each include an altitude, latitude, and longitude and are plotted by the computing device to create a terrain profile.

5. The method of claim 1, further comprising recording the attitude for each of the plurality of geographic coordinates in a memory component and automatically accessing this data with the computing device upon subsequent visits to these geographic coordinates.

6. The method of claim 1, further comprising calculating or approximating, with the computing device, attitude, altitude, latitude, and longitude of an intermediate location between the plurality of geographic coordinates.

7. The method of claim 1, further comprising calculating, with the computing device, an inertial correction factor based on the calculated attitude.

8. The method of claim 7, further comprising solving for a ground position of the vehicle with the computing device by adding the inertial correction factor to a corresponding coordinate from the geographic coordinate-determining component.

9. The method of claim 7, further comprising recording the inertial correction factor in a memory component for each of the plurality of geographic coordinates and automatically accessing with the computing device the corresponding inertial correction factor upon subsequent visits to any of the plurality of recorded geographic coordinates.

10. The method of claim 8, further comprising recording the ground position for each of the plurality of geographic coordinates and automatically accessing the corresponding ground position with the computing device upon subsequent visits to these geographic coordinates.

11. The method of claim 5, 9, or 10, further comprising preemptively adjusting vehicle settings via the computing device based on the recorded data for upcoming geographic coordinates.

12. A method of enhancing a guidance system of a vehicle having a global navigation satellite system (GNSS) receiver, the method comprising:
    obtaining, with a computing device, latitude, longitude, and altitude data from the GNSS receiver for a plurality of positions in an area of land;
    calculating, with the computing device, attitude data for each of the plurality of positions based only on the obtained latitude, longitude, and altitude data;
    calculating, with the computing device, an inertial correction factor for each of the plurality of positions based on the attitude data for each of the plurality of positions; and
    determining a ground position coordinate for each of the plurality of positions by adjusting, with the computing device, the obtained latitude and longitude based on the corresponding calculated inertial correction factor.

13. The method of claim 12, further comprising storing the latitude, longitude, and attitude data for the plurality of positions in the area of land in a memory component.

14. The method of claim 13, further comprising preemptively adjusting vehicle settings based on the recorded data for an upcoming position.

15. The method of claim 13, further comprising automatically accessing, with the computing device, the attitude data from the memory component upon subsequent visits to any of the plurality of positions.

16. A method of enhancing a guidance system of a vehicle having a global navigation satellite system (GNSS) receiver, a computing device, and a memory component, the method comprising:
    obtaining, with the computing device, latitude, longitude, and altitude from the GNSS receiver for a plurality of GNSS receiver position points in an area of land;
    calculating the slope between adjacent GNSS receiver position points using latitude, longitude, and altitude;
    calculating, with the computing device, attitude information of the vehicle at any of the plurality of GNSS receiver position points using only the latitude, longitude, and altitude values from the GNSS receiver and the calculated slopes;

storing the latitude, longitude, and attitude data for the plurality of position points in the memory component;
calculating, with the computing device, an inertial correction factor for each of the plurality of position points based on the attitude data for each of the plurality of GNSS position points; and
adding, with the computing device, the inertial correction factors to their corresponding GNSS positions to determine a corrected vehicle position coordinate for each of the plurality of GNSS receiver position points.

* * * * *